(12) United States Patent
Fontvieille et al.

(10) Patent No.: US 10,106,052 B2
(45) Date of Patent: Oct. 23, 2018

(54) SYSTEM AND CORRESPONDING METHOD FOR CONTROLLING THE ROTATION SPEED OF AN ELECTRIC MOTOR OF A MOTOR VEHICLE

(71) Applicant: RENAULT S.A.S., Boulogne Billancourt (FR)

(72) Inventors: Laurent Fontvieille, Gif-sur-Yvette (FR); Emmanuel Buis, Verrieres-le-Buisson (FR); Petru-Daniel Morosan, Cesson-Sevigne (FR); Samuel Prat, Rennes (FR)

(73) Assignee: RENAULT s.a.s., Boulogne Billancourt (FR)

( * ) Notice: Subject to any disclaimer, the term of this patent is extended or adjusted under 35 U.S.C. 154(b) by 72 days.

(21) Appl. No.: 14/759,331

(22) PCT Filed: Dec. 19, 2013

(86) PCT No.: PCT/EP2013/077330
§ 371 (c)(1),
(2) Date: Jul. 6, 2015

(87) PCT Pub. No.: WO2014/108294
PCT Pub. Date: Jul. 17, 2014

(65) Prior Publication Data
US 2015/0352977 A1  Dec. 10, 2015

(30) Foreign Application Priority Data

Jan. 10, 2013  (FR) .................................. 13 50220

(51) Int. Cl.
*B60L 15/20*  (2006.01)
*B60W 50/06*  (2006.01)
*B60W 20/00*  (2016.01)

(52) U.S. Cl.
CPC ............. *B60L 15/20* (2013.01); *B60W 20/00* (2013.01); *B60W 50/06* (2013.01);
(Continued)

(58) Field of Classification Search
CPC ........ B60L 15/20; B60W 20/00; B60W 50/06
See application file for complete search history.

(56) References Cited

U.S. PATENT DOCUMENTS

2001/0023382 A1* 9/2001 Kurishige ............ B62D 5/0466
701/41
2007/0156262 A1 7/2007 Craven
(Continued)

FOREIGN PATENT DOCUMENTS

EP 2484547 A1 8/2012
FR 2970682 A1 7/2012
(Continued)

OTHER PUBLICATIONS

International Search Report dated Jul. 4, 2014 in PCT/EP2013/077330 filed Dec. 19, 2013.
(Continued)

*Primary Examiner* — Jelani A Smith
*Assistant Examiner* — Kelly D Williams
(74) *Attorney, Agent, or Firm* — Oblon, McClelland, Maier & Neustadt, L.L.P.

(57) ABSTRACT

A system and method for controlling rotation speed of an electric motor of an electric or hybrid motor vehicle including a feedback-based regulator for regulating a torque setpoint using a control model, an input variable of the regulator being the torque setpoint as requested by a driver and the regulator using a pure delay.

19 Claims, 2 Drawing Sheets

(52) U.S. Cl.
CPC ... *B60L 2240/421* (2013.01); *B60L 2240/423* (2013.01); *B60L 2250/12* (2013.01); *B60L 2260/42* (2013.01); *B60L 2270/147* (2013.01); *B60W 2710/081* (2013.01); *Y02T 10/645* (2013.01); *Y02T 10/7275* (2013.01); *Y10S 903/906* (2013.01)

(56) References Cited

U.S. PATENT DOCUMENTS

| | | | |
|---|---|---|---|
| 2010/0042278 A1* | 2/2010 | Falkenstein | B60W 10/06 701/22 |
| 2012/0185121 A1 | 7/2012 | Umehara et al. | |
| 2013/0141028 A1 | 6/2013 | Fujiwara et al. | |
| 2014/0012476 A1 | 1/2014 | Azzi et al. | |
| 2015/0352977 A1 | 12/2015 | Fontvieille et al. | |

FOREIGN PATENT DOCUMENTS

| | | |
|---|---|---|
| JP | 2001-512882 A | 8/2001 |
| JP | 2005-269834 A | 9/2005 |
| JP | 2005-269835 A | 9/2005 |
| JP | 2005-289376 A | 10/2005 |
| JP | 2006-139952 A | 6/2006 |
| JP | 2007-219282 A | 8/2007 |
| JP | 2009-32009 A | 2/2009 |
| WO | WO 99/08289 A1 | 2/1999 |
| WO | WO 2012-011521 A1 | 1/2012 |
| WO | 2012/042325 A2 | 4/2012 |

OTHER PUBLICATIONS

French Search Report dated Oct. 28, 2013 in FR 1350220 filed Jan. 10, 2013.

* cited by examiner

SYSTEM AND CORRESPONDING METHOD FOR CONTROLLING THE ROTATION SPEED OF AN ELECTRIC MOTOR OF A MOTOR VEHICLE

BACKGROUND

The invention relates to the control of the rotation speed of an electric motor of a motor vehicle, and more particularly the reduction of the oscillations of the rotation speed.

Control of the rotation speed of an electric motor generally makes it possible to interpret the will of the driver who acts on the accelerator and brake pedals to generate a positive or negative torque setpoint. This torque setpoint is transmitted to the power electronic components (chopper, inverter, etc) to generate electrical setpoints (current and voltage) to obtain the desired torque and finally a rotation speed of the motor.

Generally, "drive train" is used to refer to all the electromechanical members which ensure the transmission of a torque setpoint to the wheels (power electronics, electric motor, engine suspension, reducing gear, etc.).

Conventionally, to follow a torque setpoint changing from 0 to a positive value, the rotation speed of the motor will increase to a value corresponding to the desired torque. That said, this increase is generally not linear (ideal response) and oscillations occur.

When running normally, the torque setpoint undergoes variations. These variations are generally not perfectly followed by the speed of the motor and damped oscillations can be observed in the trend of the rotation speed of the motor. These oscillations are disagreeable to the driver of the vehicle.

Also, with the electric machines being capable of producing very strong torque levels within very short delays, the phenomenon described above is amplified by comparison to the drive trains provided with heat engines.

It has been proposed to reduce the oscillations by correcting the torque setpoint on the basis of a measurement of the engine speed (or of the speed of the vehicle). More specifically, it has been proposed to twice derive the engine speed to extract therefrom only the annoying oscillations, and to multiply the twice-derived engine speed by a coefficient in order to finally subtract the result from a torque setpoint.

This solution is suited to oscillations occurring in vehicles with heat engines. This solution is not fast enough to deal with the oscillations in a vehicle with electric or hybrid drive. Also, this solution has the drawback of being delayed relative to the oscillations that it cannot anticipate.

Reference will also be able to be made to the document WO 2012/011521 which proposes using a direct corrector and a feedback-based corrector. The direct corrector of this document filters the variations of the torque setpoint in order to avoid excessively exciting the frequencies in the resonance area of the drive train. The feedback-based corrector reduces the oscillations by modifying the gain and the phase of the frequency response of the drive train in the resonance area.

FIG. 1 shows a schematic representation of the association of the direct corrector and of the feedback-based corrector of the document WO 2012/011521. A torque setpoint $C_{cons}$ is first of all generated, for example from information supplied by the pedals of the vehicle and corresponds to the torque setpoint as desired by the driver. This setpoint $C_{cons}$ is applied to the input of a direct corrector 1 having the following transfer function:

$$\frac{G_{obj}(s)}{\hat{G}(s)}$$

With:
$G_{obj}(s)$ being the objective transfer function, that is to say without oscillations,
$\hat{G}(s)$ being the control model, that is to say the model of the drive train.

An adder 2 is linked by a first input to the output of the corrector 1. The output of the adder 2 is linked to a first input of another adder 3, another input of which receives a disturbance $C_{perturb}$. The output of the adder 3 communicates with the drive train 4 which has a transfer function G(s). The drive train 4 makes it possible to obtain a rotation speed of the motor $\omega_{mot}$.

The feedback-based corrector described in this document comprises a corrector 5 having the transfer function $\hat{G}(s)$ whose output is compared with the speed of the motor $\omega_{mot}$ (subtractor 6). The output of the subtractor 6 is linked to an additional corrector 7 having the transfer function:

$$\frac{H(s)}{\hat{G}(s)}$$

In which H(s) is chosen to correct the oscillations.

The control model $\hat{G}(s)$ has a frequency response revealing a resonance area accompanied by a phase shift. Furthermore, this control model is incomplete and does not precisely correspond to the real drive train, although it is intended to operate if the following relationship is verified:

$$\hat{G}(s) = G(s)$$

This relationship does not make it possible to take into account the ageing of the drive trains and the dispersion of their properties over a number of vehicles.

BRIEF SUMMARY

The aim of the invention is to obtain a reduction of the oscillations suited to electric vehicles, to propose a better control model, and to obtain a better frequency response.

According to one aspect, there is proposed a system for controlling the rotation speed of an electric motor of a motor vehicle with electric or hybrid propulsion comprising a feedback-based corrector of the torque setpoint using a control model.

According to a general feature, the input quantity of the corrector is the torque setpoint as requested by the driver and the corrector uses a pure delay.

Thus, contrary to the solutions proposed in the prior art, it is directly the torque setpoint as requested by the driver which is applied at the input to the corrector and not a setpoint obtained after the feedback loop. It is thus easier to develop the control model and the correction is also simplified.

Also, whereas, in the prior art, no pure delay is used, here, a correction is applied which uses such a delay. A better representation of the drive train is thus obtained for the frequencies higher than the resonance frequency.

The pure delay can be a Padé approximation, for example a rational function that can be set in the form of a ratio of two polynomials. The Padé approximation is well suited to approximating a pure delay.

The control model can comprise a first low-pass filter having a first time constant corresponding to the electromechanical time constant, that is to say the time constant specific to all the electromechanical systems. Such a low-pass filter makes it possible to get closer to the response of the drive train.

The control model can comprise a second low-pass filter having a second time constant lower than the first time constant, even much lower than the first time constant. A better representation of the drive train is thus obtained with respect to the phase shift of the frequency response.

The system can further comprise means for calculating the sum of the torque setpoint as requested by the driver and of a torque setpoint obtained by feedback communicating with the vehicle drive train to obtain a rotation speed of the motor, means for calculating the difference between the rotation speed of the motor and the output of the corrector using a control model and a pure delay, and an additional corrector of the result of this difference having, for output, said torque setpoint obtained by feedback.

The system can comprise a high-pass filter suitable for filtering the output of the additional corrector suitable for supplying said torque setpoint obtained by feedback. The use of a high-pass filter notably makes it possible to attenuate the impact of all the static errors between the drive train and the corrector.

According to another aspect, there is proposed a method for controlling the rotation speed of an electric motor of a motor vehicle with electric or hybrid propulsion comprising a feedback-based correction using a control model.

According to a general feature of the method, a torque setpoint as requested by the driver is corrected by feedback by using a pure delay.

The pure delay can be a Padé approximation.

The correction can comprise a first low-pass filtering having a first time constant corresponding to the electromechanical time constant.

The control model comprises a second low-pass filtering having a second time constant lower than said first time constant.

The method can further comprise a calculation of the sum of the torque setpoint as requested by the driver and of a torque setpoint obtained by feedback communicated to the vehicle drive train to obtain a rotation speed of the motor, a calculation of the difference between the rotation speed of the motor and the result of the correction using a control model and a pure delay, and an additional correction of the result of this difference to obtain said torque setpoint obtained by feedback.

The method a high-pass filtering to obtain said torque setpoint obtained by feedback.

BRIEF DESCRIPTION OF THE DRAWINGS

Other aims, features and advantages will become apparent on reading the following description given purely as a nonlimiting example and with reference to the attached drawings in which.

DETAILED DESCRIPTION

Figure 1:
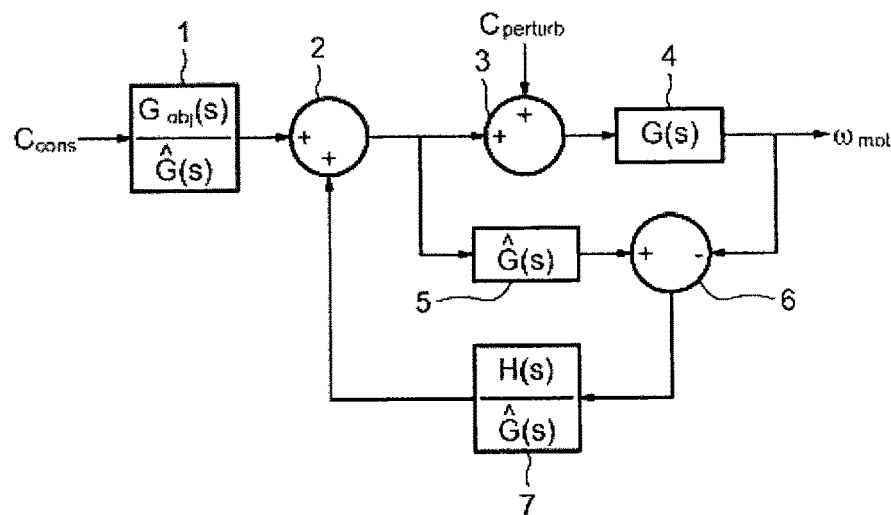
FIG. 1, already described, schematically illustrates the control of the rotation speed of a motor according to the prior art.
Figure 2:
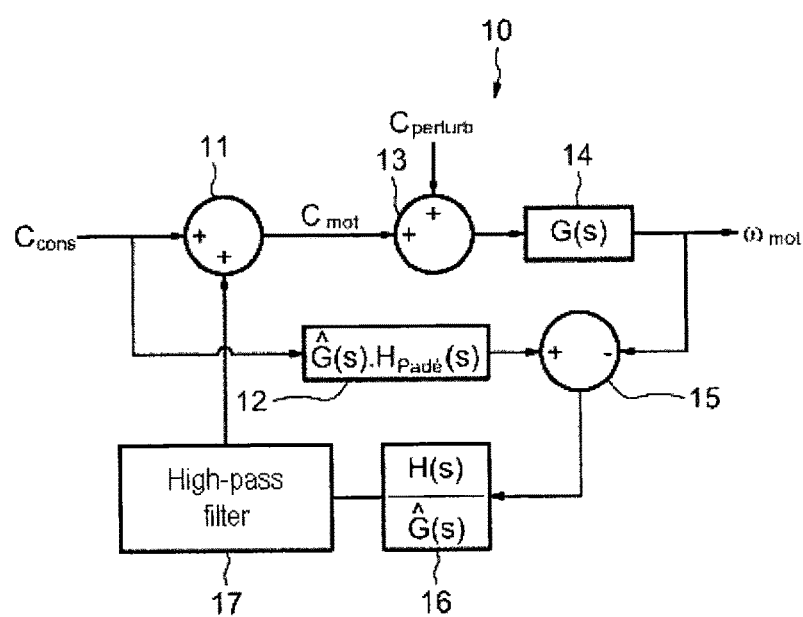
FIG. 2 illustrates the control of the rotation speed of a motor according to one implementation and embodiment of the invention.

FIG. 2 shows a control system 10 in which a torque setpoint $C_{cons}$ as desired by the driver via the pedals is supplied on the one hand to a first input of an adder 11 and to a corrector 12. The output of the adder 11 is connected to an adder 13 to add a disturbance $C_{perturb}$. The output of the adder 13 is a torque setpoint which is supplied to the drive train 14 having a transfer function G(s), which, in response, controls an electric motor to obtain a rotation speed $\omega_{mot}$.

The corrector 12 has the transfer function $\hat{G}(s) \times H_{Padé}(s)$ in which $H_{Padé}(s)$ is a pure delay, for example a Padé approximation. The output of the corrector 12 is connected to a subtractor 15 which calculates the difference between a rotation speed modeled by the control model with the pure delay and the real speed of the motor $\omega_{mot}$.

The output of the subtractor 15 communicates with the input of an additional corrector 16 intended to attenuate the oscillations and which has the following transfer function:

$$\frac{H(s)}{\hat{G}(s)}$$

The output of the additional corrector 16 communicates with a high-pass filter 17, which supplies a corrected setpoint to another input of the adder 11. The high-pass filter can have a transfer function defined by the cut-off pulsation $\omega_{HP}$:

$$\frac{s}{s + \omega_{HP}}$$

The Padé approximation is particularly well suited to approximating a delay, and can be presented in the form of the following rational function:

$$H_{Padé}(s) = \frac{P_m(s)}{Q_n(s)}$$

In which $P_m(s)$ and $Q_n(s)$ are two polynomials defined by the following two equations:

$$P_m(s) = \sum_{k=0}^{m} \frac{(m+n-k)!m!}{(m+n)!k!(m-k)!}(-s)^k$$

$$Q_n(s) = \sum_{k=0}^{n} \frac{(m+n-k)!n!}{(m+n)!k!(n-k)!}s^k$$

It is possible to choose n to be equal to m and to be limited to an order 2 (n=m=2). The transfer function $H_{Padé}$ of a pure delay $\tau$ is then expressed according to the following equation:

$$H_{Padé}(s) = \frac{s^2 - \frac{6}{\tau}s + \frac{12}{\tau^2}}{s^2 + \frac{6}{\tau}s + \frac{12}{\tau^2}}$$

Also, the control model $\hat{G}(s)$ can comprise two low-pass filters. More specifically, the control model $\hat{G}(s)$ can comprise a first low-pass filter with a first time constant $T_{p1}$ specific to all the electromechanical systems. This first low-pass filter can have the following transfer function:

$$\frac{1}{1+T_{p1} \cdot s}$$

Furthermore, the control model $\hat{G}(s)$ can comprise another low-pass filter having a second time constant $T_{p2}$ chosen to be much lower than $T_{p1}$ ($T_{p1} \ll T_{p2}$). This second low-pass filter can have the following transfer function:

$$\frac{1}{1+T_{p2} \cdot s}$$

It is thus possible to have a control model that makes it possible to obtain a better representation with regard to the phase shift of the frequency response.

It is therefore possible to choose a control model comprising the two low-pass filters of the following form:

$$\hat{G}(s) = \frac{b_2 s^2 + b_1 s + b_0}{(s^2 + 2\zeta\omega_p s + \omega_p)(1+T_{P1}s)(1+T_{P2}s)}$$

With:
$b_2$, $b_1$ and $b_0$ being the zeros of the transfer function,
$b_2$ being the static gain,
$\omega_p$ being the resonance frequency, and
$\zeta$ being the damping factor at the resonance frequency.

It can be noted that, contrary to the control model used in the prior art (WO 2012/011521), there is no integrator (that is to say 1/s), and there are two low-pass filters. The model without integrator corresponds more to the response of the drive train.

The transfer function of the corrector can finally be written as:

$$\hat{G}(s) \cdot H_{Padé}(s) = \frac{b_2 s^2 + b_1 s + b_0}{(s^2 + 2\zeta\omega_p s + \omega_p)(1+T_{P1}s)(1+T_{P2}s)} \cdot \frac{s^2 - \frac{6}{\tau}s + \frac{12}{\tau^2}}{s^2 + \frac{6}{\tau}s + \frac{12}{\tau^2}}$$

Figure 3:
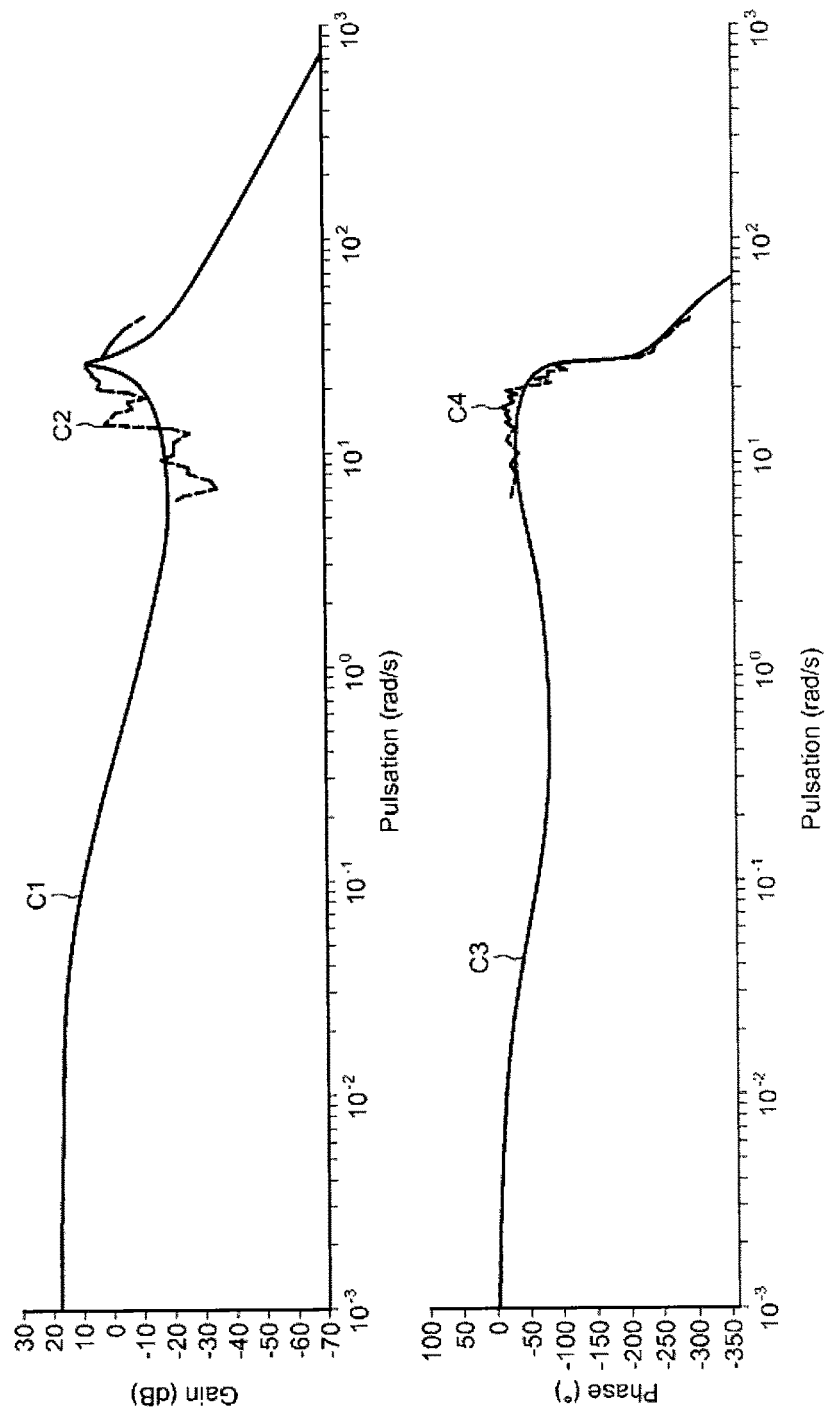
FIG. 3 illustrates the frequency response of the control model according to the invention.

FIG. 3 shows, by a continuous line, the trend of the decibel gain of the corrector $\hat{G}(s) \cdot H_{Padé}(s)$ (curve C1) as a function of the rotation speed of a motor in radians per second. In this figure, the gain measured on the drive train of the vehicle is also represented by a discontinuous line (curve C2). Also represented in FIG. 3 is the phase in degrees of the model $\hat{G}(s) \cdot H_{Padé}(s)$ (curve C3) and by a discontinuous line, the phase measured on the drive train of the vehicle.

It should be noted that the phase shift obtained is particularly close to that measured. A control model having the transfer function $\hat{G}(s) \cdot H_{Padé}(s)$ therefore makes it possible to obtain a better frequency response.

It can also be noted that the invention makes it possible to obtain better stability margins, notably with respect to the gain margin, the phase margin and the delay margin.

In order to determine these margins, it is necessary to obtain the transfer functions of the system, and more specifically by considering the transfer function between a disturbance and the speed of the motor, by assuming in an ideal case ($G(s) = \hat{G}(s) \cdot H_{Padé}(s)$):

$$\frac{\omega_{mot}(s)}{C_{perturb}(s)} = \frac{G(s)}{1+\frac{s}{s+\omega_{HP}}H(s)}$$

In this transfer function, and as indicated above, the function of the corrector H(s) is to reduce the oscillations. The following form can be imposed on H(s):

$$H(s) = \frac{p_1 s + p_0}{(s^2 + 2\omega_0 s + \omega_0^2)\left(\frac{s}{\beta\omega_0}+1\right)^2}$$

Where $p_1$ and $p_0$ are calculated to solve the following equation:

$$(s^2 + 2\omega_0 s + \omega_0^2)\left(\frac{s}{\beta\omega_0}+1\right) - (p_1 s + p_0) =$$
$$(s^2 + 2\zeta\omega_0 s + \omega_0^2)(q_2 s^2 + q_1 s + q_0)$$

In which, the term $\beta$ makes it possible to parameterize the time constant of the corrector H(s) as a function of the resonance frequency of the control model. This equation has a single solution and the parameters $q_2$, $q_1$, $q_0$, $p_1$ and $p_0$ are expressed as functions of $\beta$, $\omega_0$ and $\zeta$.

By using a Padé approximation of order 2 as defined above, the coefficients $p_1$ and $p_0$ are calculated by means of the following equation:

$$\frac{\omega_{mot}(s)}{C_{perturb}(s)} = \frac{(b_2 s^2 + b_1 s + b_0)(s+\omega_{HP})\left(\frac{s}{\beta\omega_0}+1\right)}{\left[(s+\omega_{HP})(s^2 + 2\omega_0 s + \omega_0^2)\left(\frac{s}{\beta\omega_0}+1\right) + s(p_1 s + p_0)\right]} H_{Padé}(s)$$
$$(T_{p1}s+1)(T_{p2}s+1)$$

And the transfer function between a disturbance and the rotation speed of the motor is then written as:

$$(s^2 + 2\zeta\omega_0 s + \omega_0^2)$$

It can be noted that there is no oscillator, that is to say a disappearance of the term:

$$\frac{\omega_{mot}(s)}{C_{perturb}(s)} = \frac{-s \cdot H(s)}{G(s)(s+\omega_{HP})}$$

It is finally possible to calculate the stability margins of the corrector by feedback, in which, with the high-pass filter, the following transfer function is obtained:

$$H_{bo}(s) = \frac{-s \cdot H(s)}{(s+\omega_{HP})}$$

The open loop transfer function $H_{bo}(s)$ of such a transfer (referring to FIG. 2) is:

$$H_{bo}(s) = \frac{-s \cdot H(s)}{(s + \omega_{HP})}.$$

Those skilled in the art will be able to calculate said margins of such a transfer function. Here, a gain margin of 4.16 decibels, a phase margin of 122.16 degrees and a delay margin of 49.8 milliseconds are obtained. The cut-off pulsation of the filtering is $5 \times \omega_0$.

It can be noted that a better stability and a good robustness to the dispersion and derived of the delay are obtained.

By virtue of the invention, a reduction of the oscillations suited to electric vehicles is obtained, by using a better control model with a good frequency response.

The invention claimed is:

1. An apparatus that controls a rotation speed of an electric motor of a motor vehicle with electric or hybrid propulsion comprising:
a feedback-based corrector of a torque setpoint using a control model, an input quantity of the feedback-based corrector being the torque setpoint as requested by a driver and the feedback-based corrector uses a pure delay to determine a corrected torque setpoint; and
a drive train that receives the corrected torque setpoint and controls the rotation speed of the electric motor in response to the corrected torque setpoint that was received,
wherein an output of said feedback-based corrector is connected to a subtractor that calculates a difference between a rotation speed that is modeled by the control model using the pure delay and a measured rotation speed, an output of said subtractor communicating with an input of a supplementary corrector that is configured to reduce oscillations of the rotation speed of the electric motor.

2. The apparatus as claimed in claim 1, wherein the pure delay is a Padé approximation.

3. The apparatus as claimed in claim 1, wherein the control model comprises a first low-pass filter having a first time constant corresponding to an electromechanical time constant.

4. The apparatus as claimed in claim 3, wherein the control model comprises a second low-pass filter having a second time constant lower than the first time constant.

5. The apparatus as claimed in claim 1,
wherein the apparatus calculates a sum of the torque setpoint as requested by the driver and of a torque setpoint obtained by feedback communicating with the drive train of the vehicle to obtain the rotation speed of the electric motor.

6. The apparatus as claimed in claim 5, further comprising a high-pass filter configured to supply the torque setpoint obtained by feedback.

7. The apparatus as claimed in claim 1, wherein the control model does not include an integrator.

8. The apparatus as claimed in claim 1, wherein the torque setpoint as requested by the driver is directly input to the feedback-based corrector.

9. A method for controlling a rotation speed of an electric motor of a motor vehicle with electric or hybrid propulsion comprising:
determining a feedback-based correction via a feed-back based corrector using a control model, including correcting a torque setpoint as requested by a driver by feedback by using a pure delay to determine a corrected torque setpoint, and
controlling the rotation speed of the electric motor based on the corrected torque setpoint,
wherein an output of said feedback-based corrector is connected to a subtractor that calculates a difference between a rotation speed that is modeled by the control model using the pure delay and a measured rotation speed, an output of said subtractor communicating with an input of a supplementary corrector that is configured to reduce oscillations of the rotation speed of the electric motor.

10. The method as claimed in claim 9, wherein the pure delay is a Padé approximation.

11. The method as claimed in claim 9, wherein the correction comprises a first low-pass filtering having a first time constant corresponding to an electromechanical time constant.

12. The method as claimed in claim 11, wherein the control model comprises a second low-pass filtering having a second time constant lower than the first time constant.

13. The method as claimed in claim 9, further comprising:
a calculation of a sum of the torque setpoint as requested by the driver and of a torque setpoint obtained by feedback communicated to a drive train of the motor vehicle to obtain the rotation speed of the electric motor.

14. The method as claimed in claim 13, further comprising a high-pass filtering to obtain the torque setpoint obtained by feedback.

15. The method as claimed in claim 9, wherein the control model does not include an integrator.

16. The method as claimed in claim 9, wherein the torque setpoint as requested by the driver is directly input to the feedback-based corrector.

17. A drive train of a motor vehicle with electric or hybrid propulsion, comprising:
an electronic motor; and
an apparatus that controls a rotation speed of the electric motor, the apparatus comprising:
a feedback-based corrector of a torque setpoint using a control model, an input quantity of the feedback-based corrector being the torque setpoint as requested by a driver and the feedback-based corrector uses a pure delay to determine a corrected torque setpoint,
wherein the apparatus applies the corrected torque setpoint to control the rotation speed of the electric motor, and
wherein an output of said feedback-based corrector is connected to a subtractor that calculates a difference between a rotation speed that is modeled by the control model using the pure delay and a measured rotation speed, an output of said subtractor communicating with an input of a supplementary corrector that is configured to reduce oscillations of the rotation speed of the electric motor.

18. The drive train as claimed in claim 17, wherein the control model does not include an integrator.

19. The drive train as claimed in claim 17, wherein the torque setpoint as requested by the driver is directly input to the feedback-based corrector.

* * * * *